United States Patent
Kirihara et al.

(10) Patent No.: US 11,133,674 B2
(45) Date of Patent: Sep. 28, 2021

(54) SYSTEM OPERATION SUPPORT DEVICE AND METHOD IN POWER SYSTEM, AND WIDE-AREA MONITORING PROTECTION CONTROL SYSTEM

(71) Applicant: Hitachi, Ltd., Tokyo (JP)

(72) Inventors: Kenta Kirihara, Tokyo (JP); Sumito Tobe, Tokyo (JP); Masahiro Yatsu, Tokyo (JP); Hiroo Horii, Tokyo (JP); Jun Yamazaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 84 days.

(21) Appl. No.: 16/618,816

(22) PCT Filed: Apr. 10, 2018

(86) PCT No.: PCT/JP2018/015031
§ 371 (c)(1),
(2) Date: Dec. 3, 2019

(87) PCT Pub. No.: WO2019/008856
PCT Pub. Date: Jan. 10, 2019

(65) Prior Publication Data
US 2021/0083475 A1 Mar. 18, 2021

(30) Foreign Application Priority Data
Jul. 7, 2017 (JP) .............................. JP2017-133519

(51) Int. Cl.
*H02J 3/00* (2006.01)
(52) U.S. Cl.
CPC ............ *H02J 3/0012* (2020.01); *H02J 3/003* (2020.01); *H02J 3/004* (2020.01); *H02J 3/0075* (2020.01)

(58) Field of Classification Search
CPC .......... H02J 3/0012; H02J 3/003; H02J 3/004; H02J 3/0075
(Continued)

(56) References Cited

U.S. PATENT DOCUMENTS

2016/0084889 A1 3/2016 Mezic et al.
2016/0334447 A1* 11/2016 Parashar ............. H02J 13/0006

FOREIGN PATENT DOCUMENTS

| CN | 102938587 A | 2/2013 |
|---|---|---|
| JP | 09-23581 A | 1/1997 |

OTHER PUBLICATIONS

Kai E. Van Horn, et al. "Sensitivity-Based Line Outage Angle Factors", 2015 North American Power Symposium (NAPS), Charlotte, NC, 2015, pp. 1-5.
(Continued)

*Primary Examiner* — Hal Kaplan
(74) *Attorney, Agent, or Firm* — Mattingly & Malur, PC

(57) ABSTRACT

A system operation support device in a power system stabilizes the power system and has a predicted accident time system state calculation unit that receives measured data, a system topology, and a target accident type as inputs, and calculates a system state and a predicted accident time system state. A control menu calculation unit receives the results of the predicted accident time system state as inputs and calculates a control menu. A restoration control means calculation unit receives the result of the control menu calculation as an input and calculates a restoration control procedure. A restoration prevention control procedure calculation unit receives the result of the restoration control and a target restoration time parameter as inputs and performs a power generator output adjustment time simulation, a necessary prevention control amount calculation, and a prevention control procedure calculation. A display unit displays
(Continued)

the restoration control procedure and the prevention control procedure.

6 Claims, 18 Drawing Sheets

(58) Field of Classification Search
USPC .......................................................... 700/286
See application file for complete search history.

(56) References Cited

OTHER PUBLICATIONS

International Search Report of PCT/JP2018/015031 dated Jul. 10, 2018.
Extended European Search Report received in corresponding European Application No. 18828942.5 dated Oct. 23, 2020.

* cited by examiner

[FIG. 1]
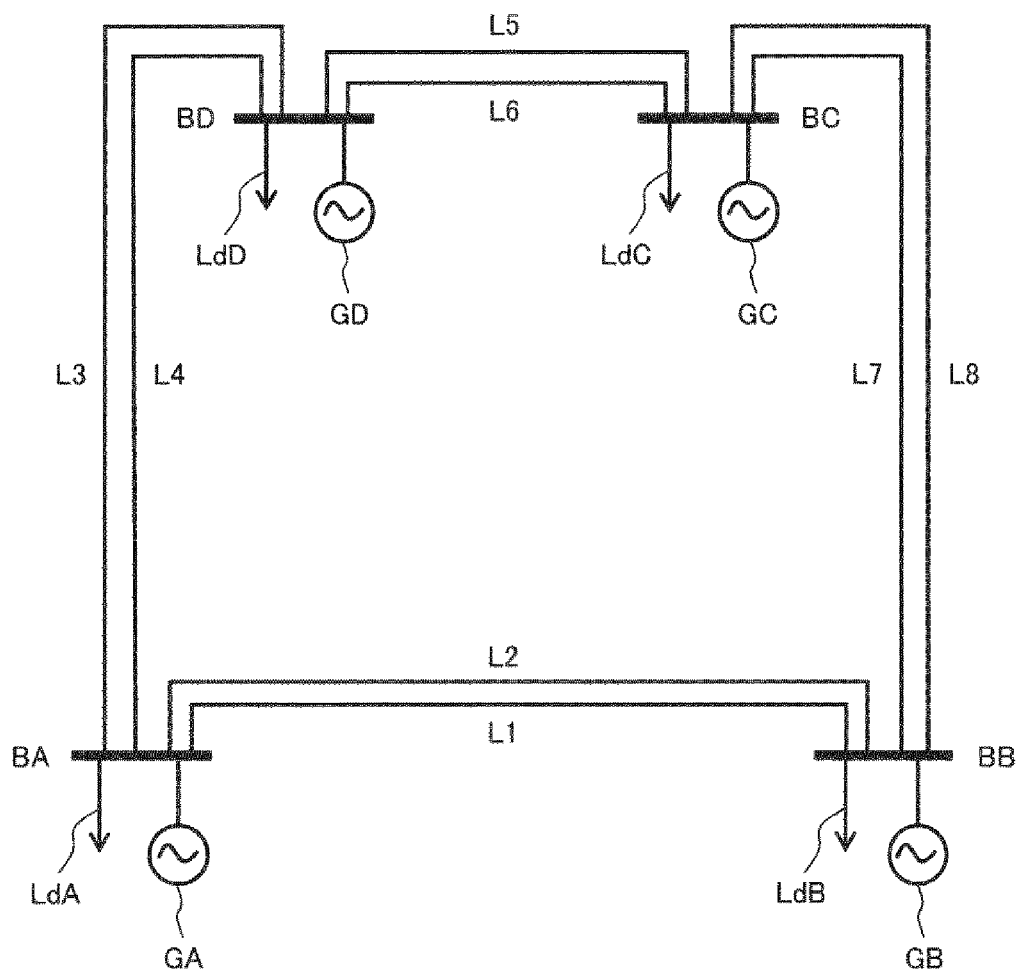

[FIG. 2]
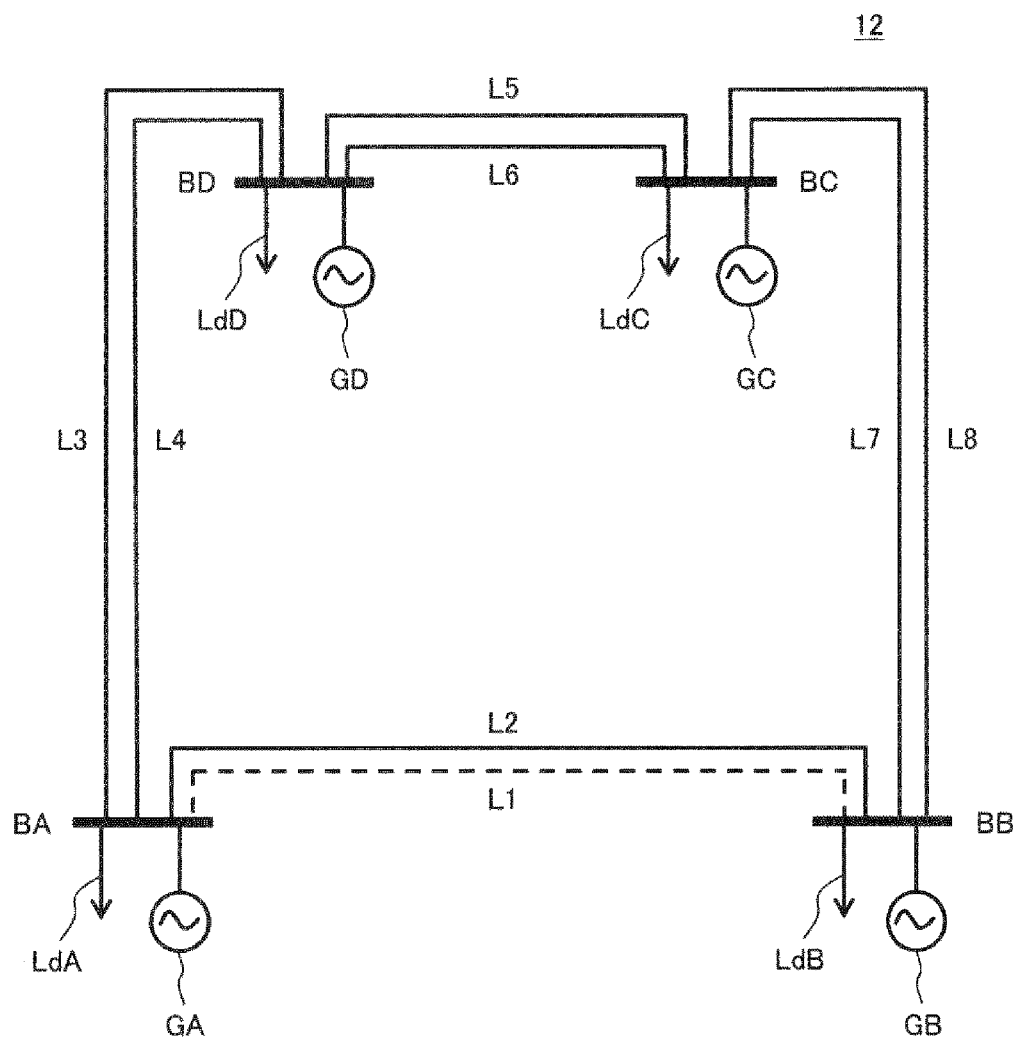
[FIG. 3]
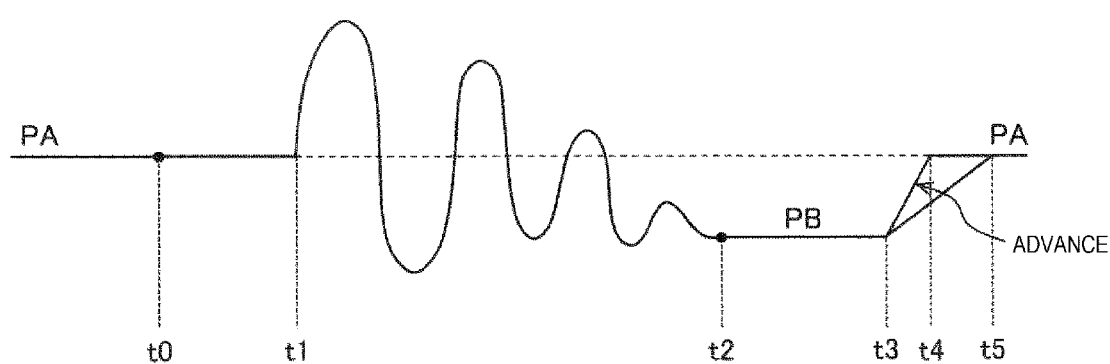

[FIG. 4]
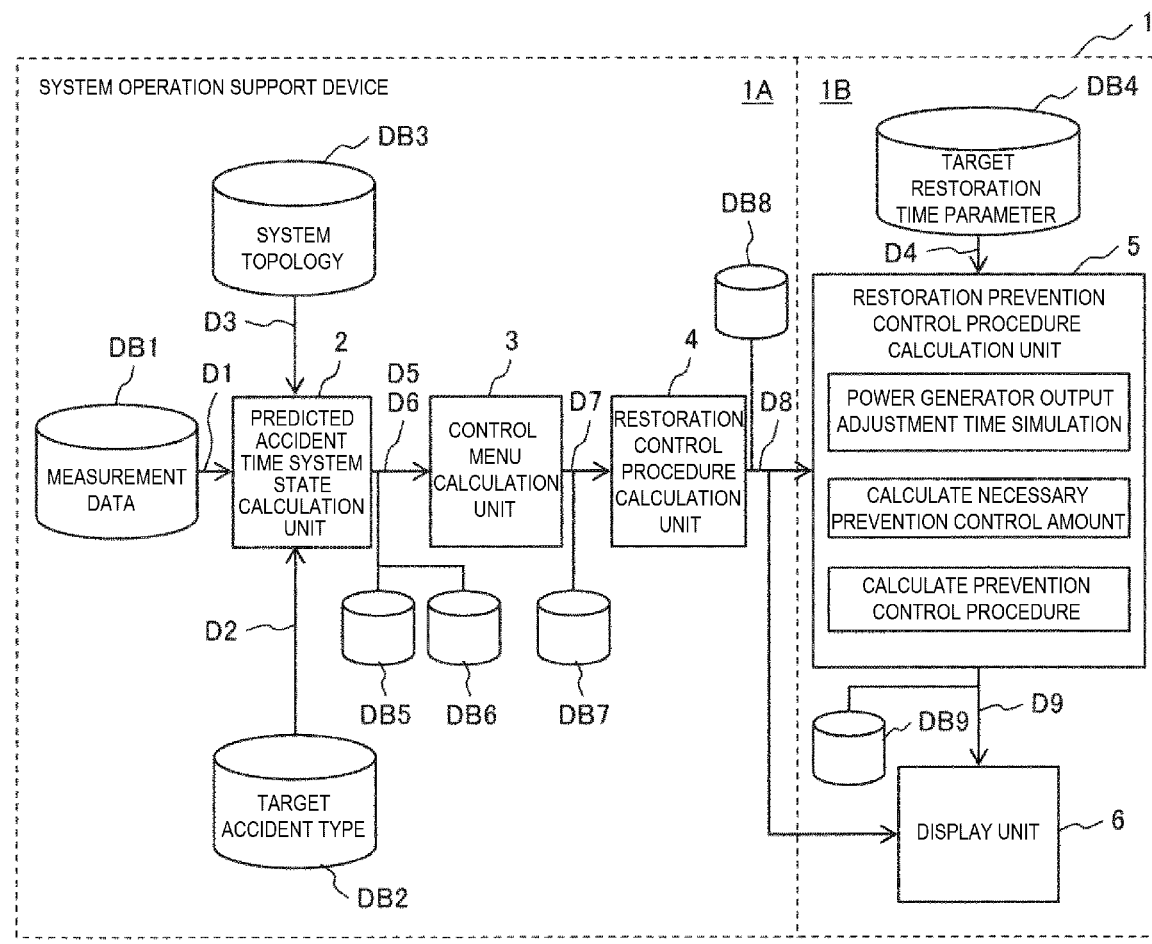

[FIG. 5]
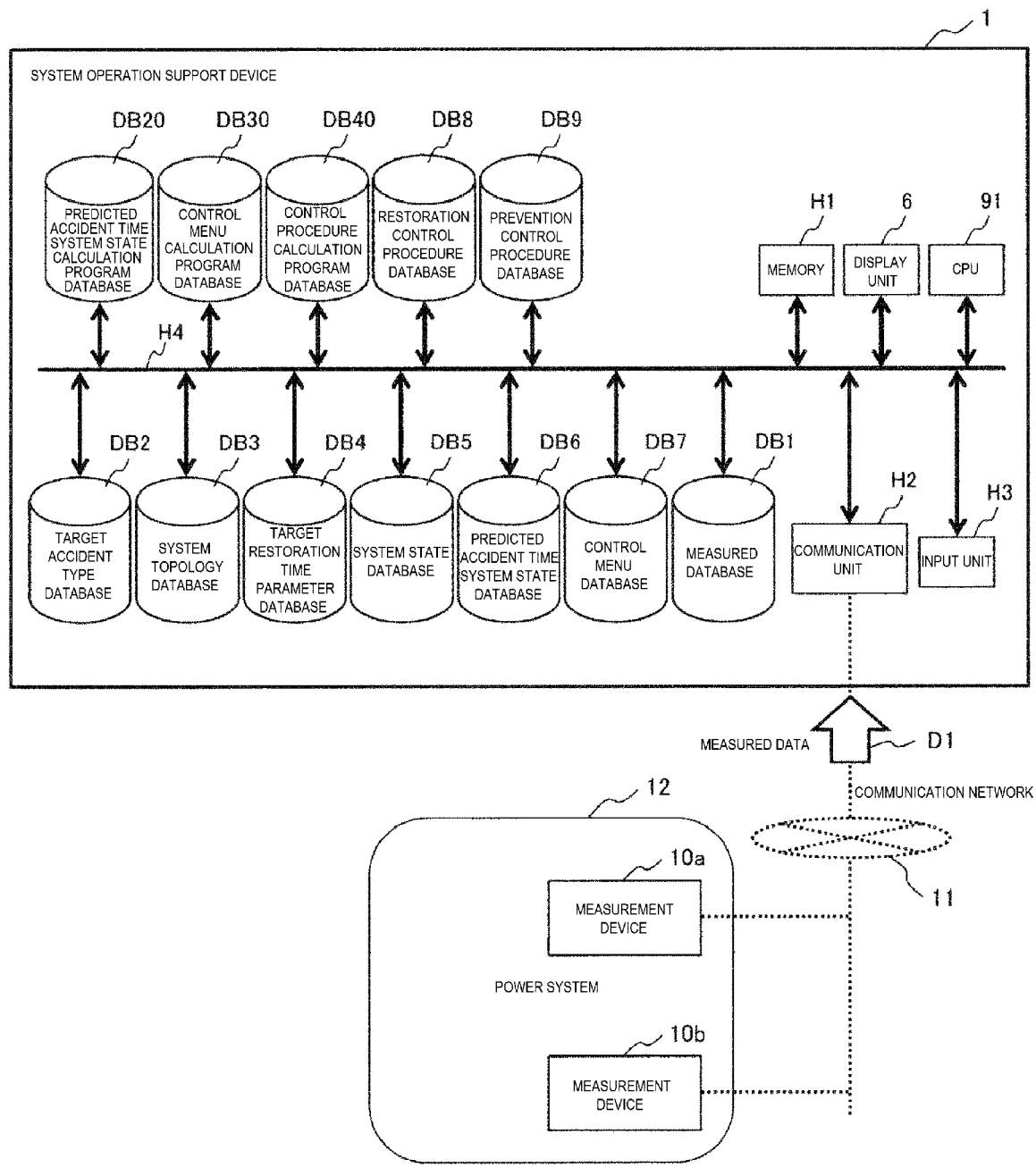

[FIG. 6]
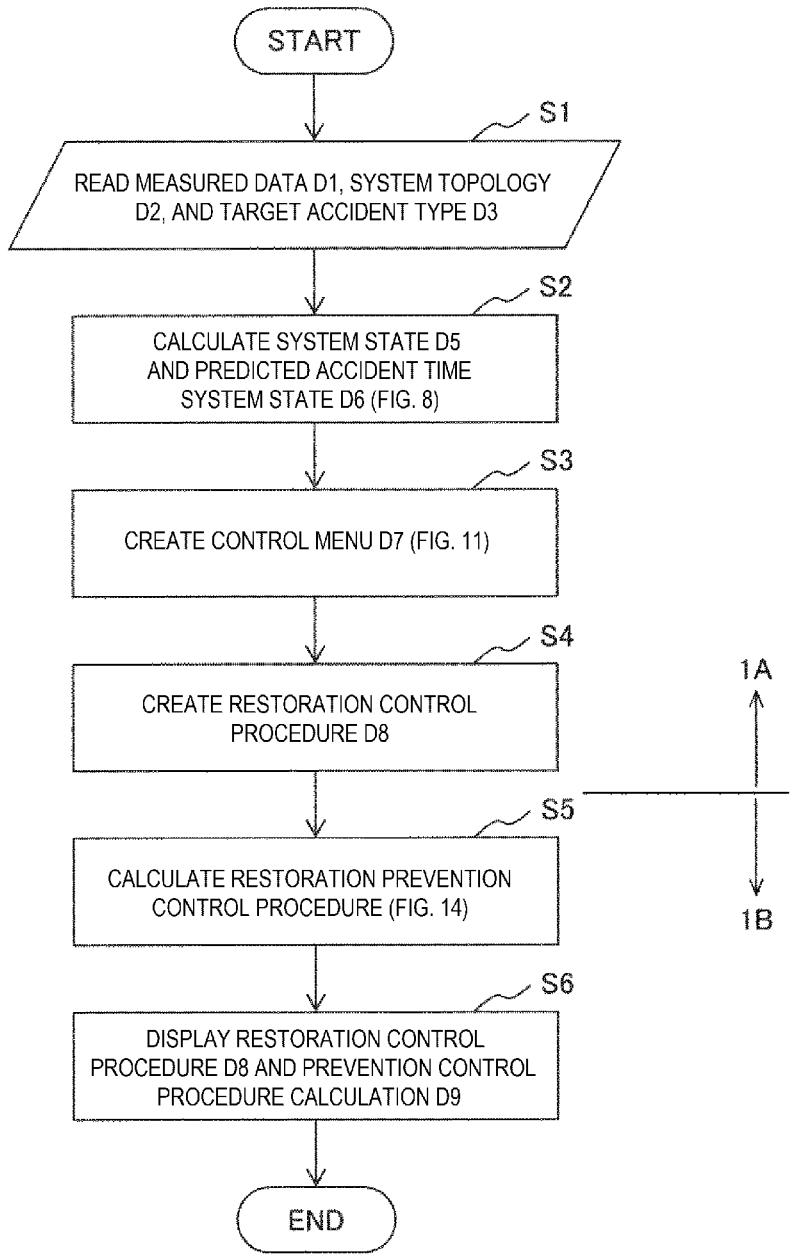

[FIG. 7]
DB1(D1)
| TIME POINT | MEASURED VALUE | MEASURED INFORMATION |
|---|---|---|
| 2016/12/15 10:52 | 100 | BUS NO. 13 VOLTAGE |
| 2016/12/15 10:52 | 10 | BUS NO. 123 PHASE |
| 2016/12/15 10:52 | 10 | ........ |
D11, D12, D13
[FIG. 8]
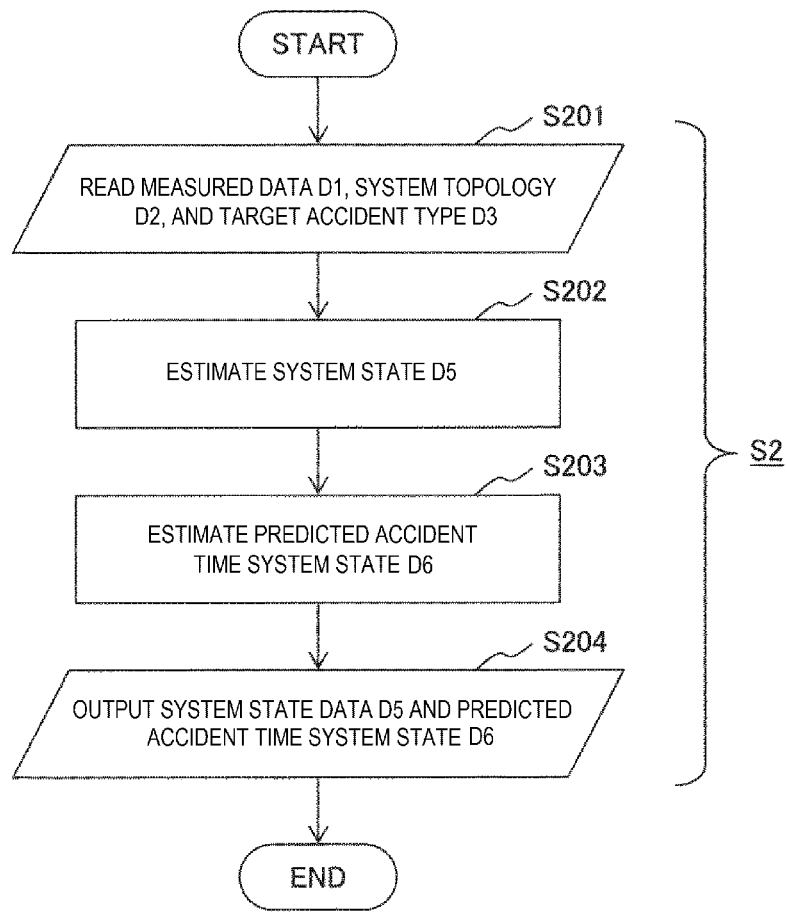

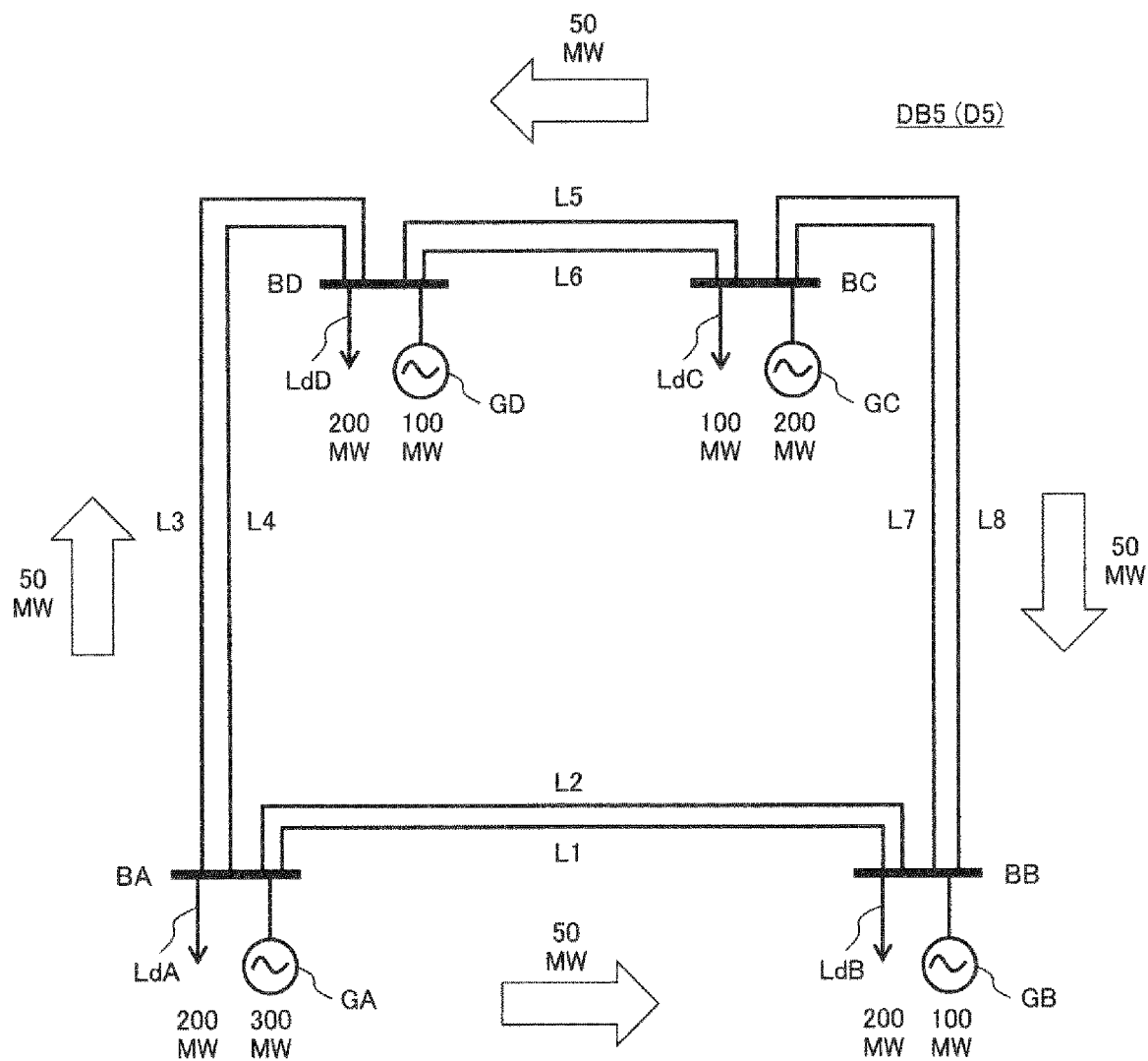
[FIG. 9]

[FIG. 10]
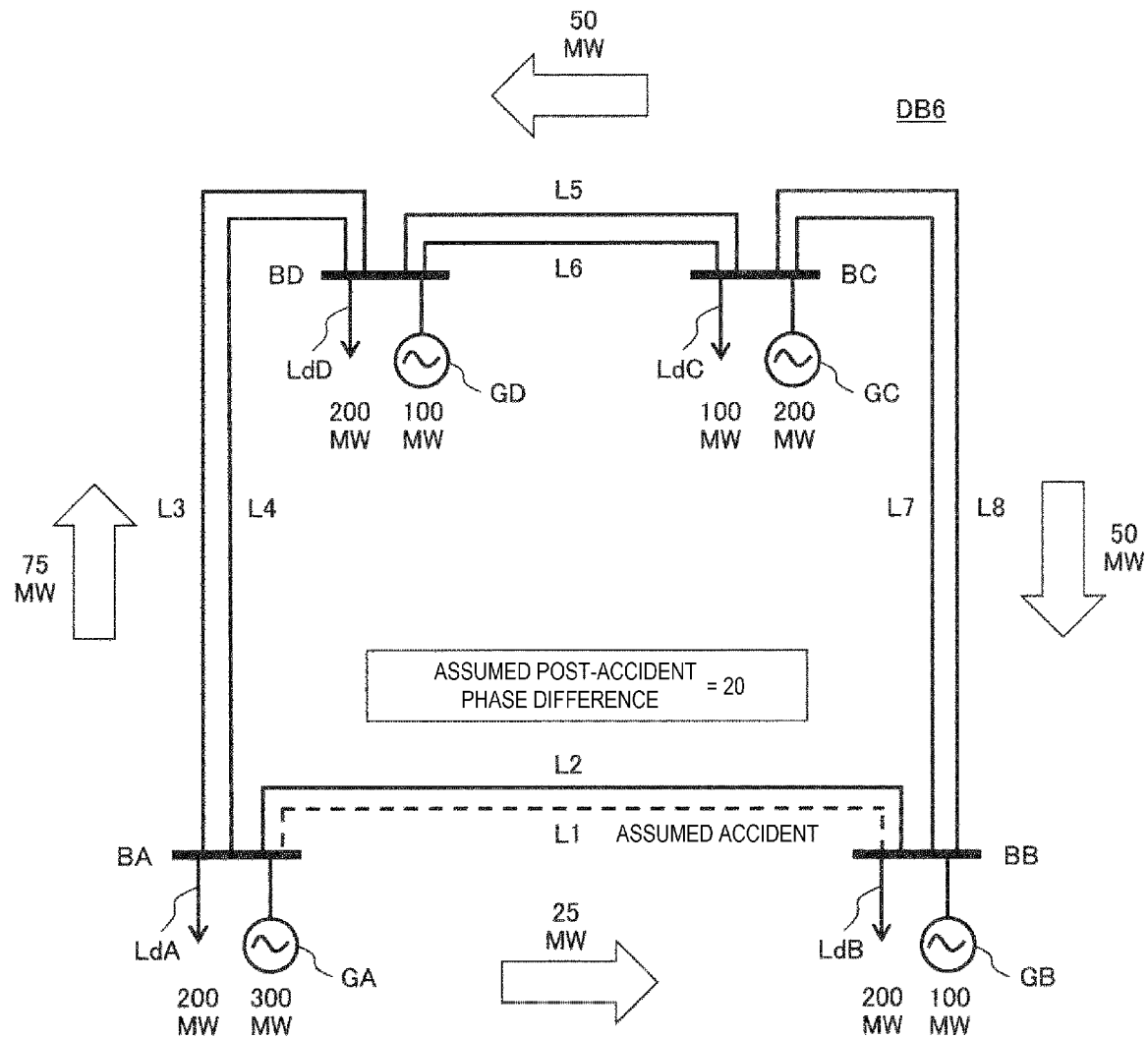

[FIG. 11]
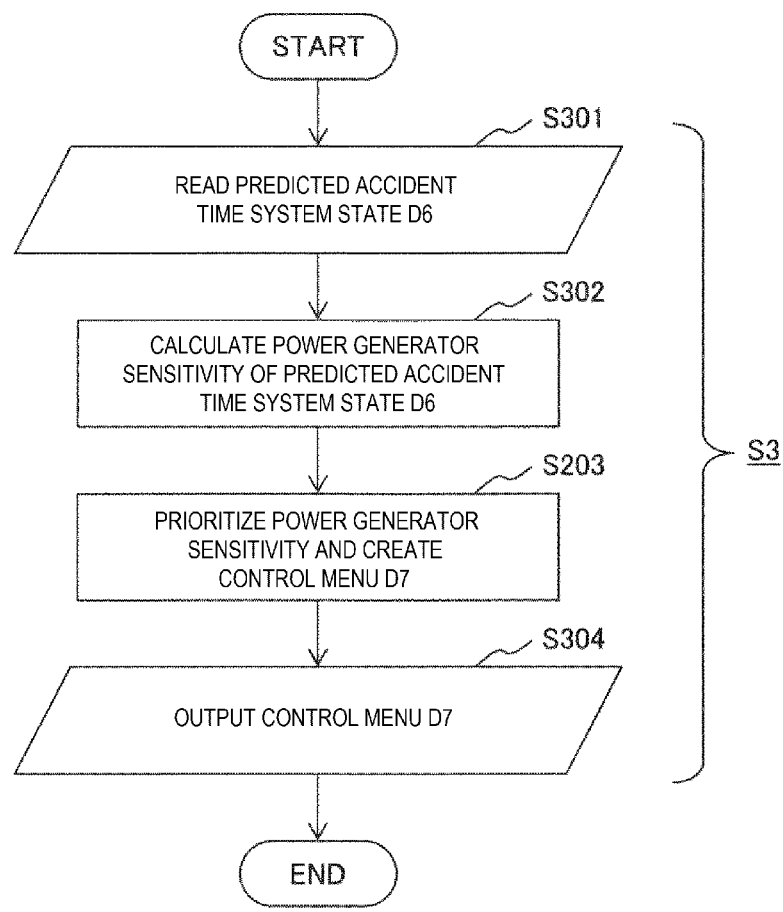

[FIG. 12]
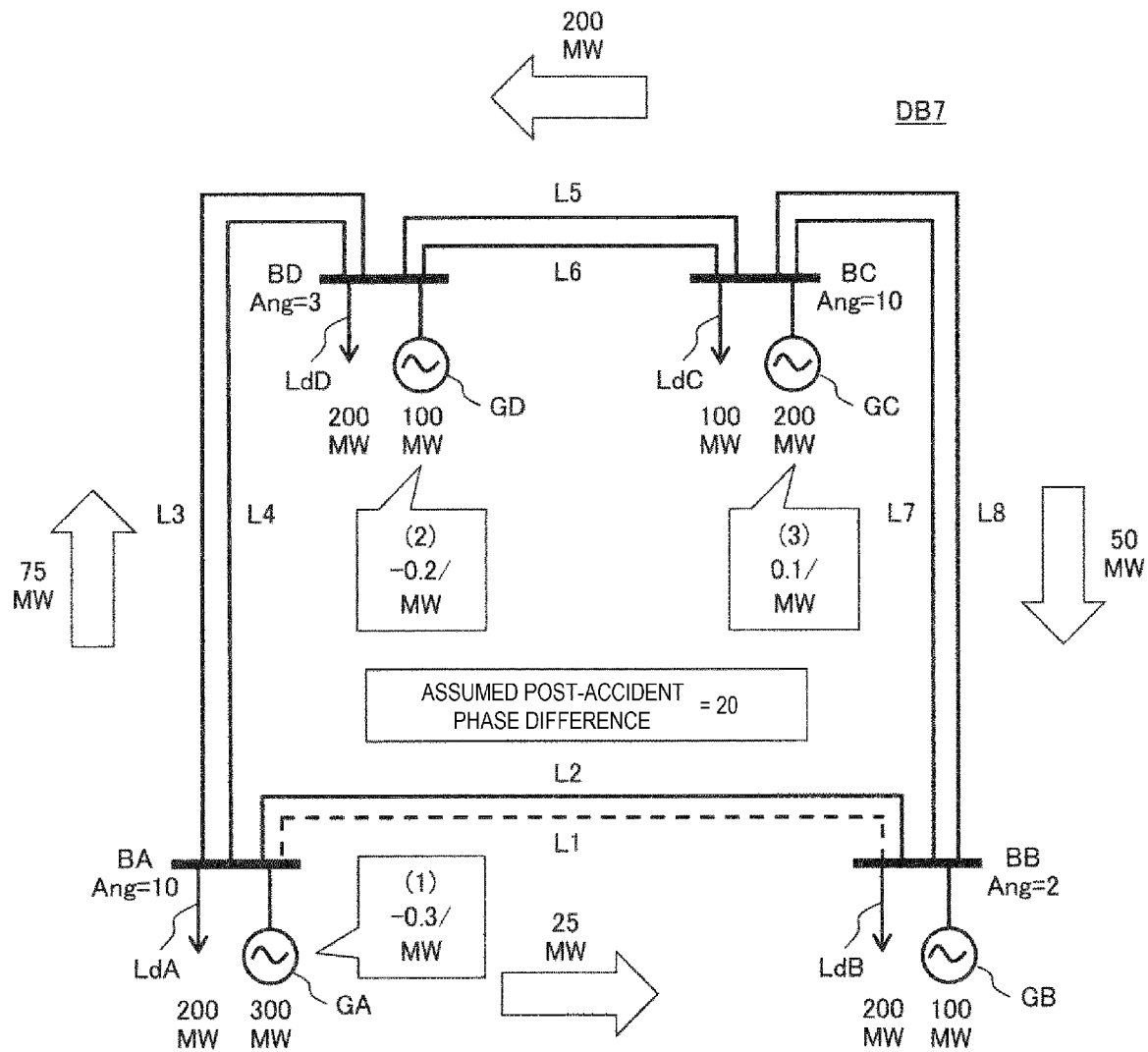

[FIG. 13]
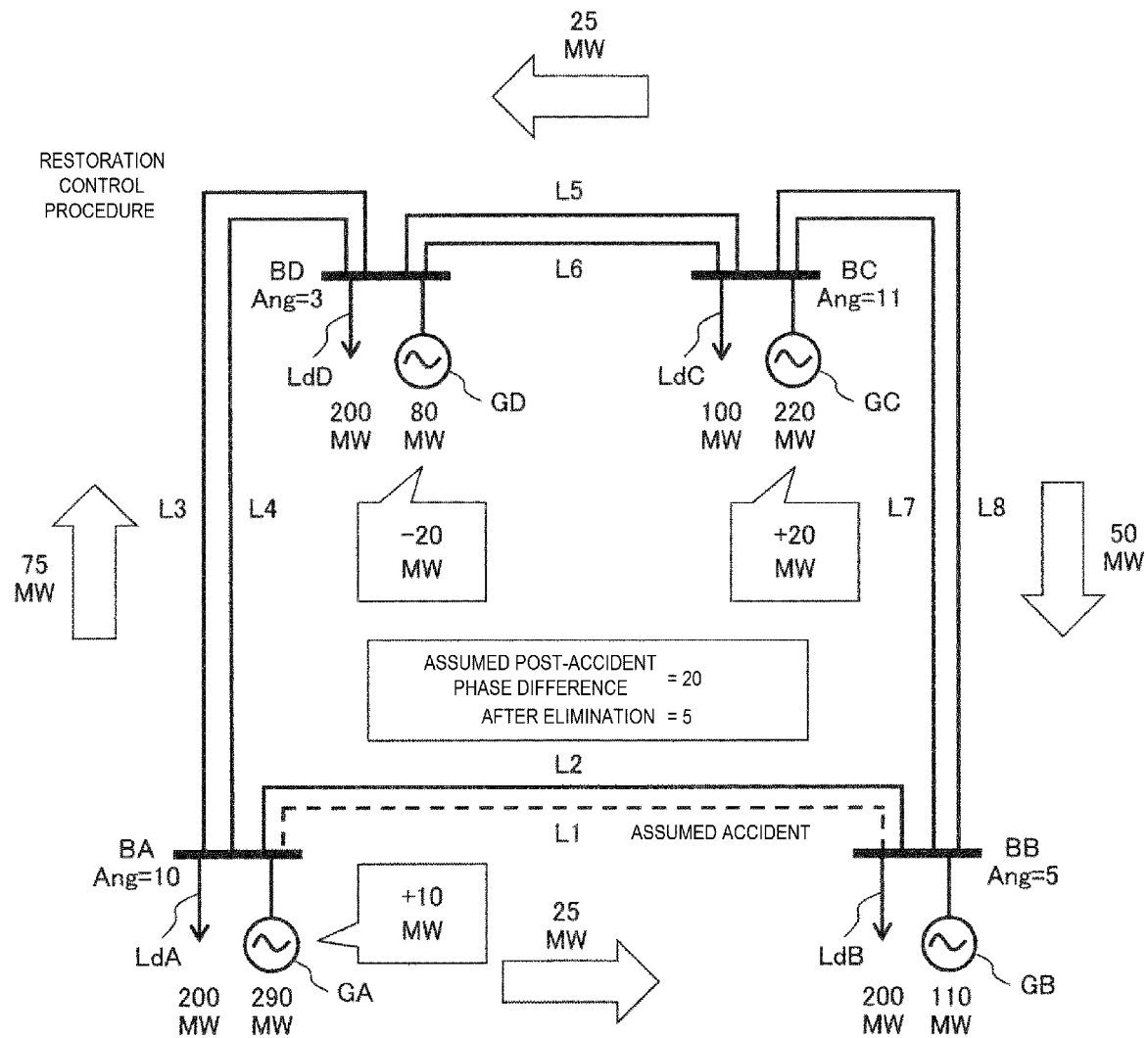

[FIG. 14]
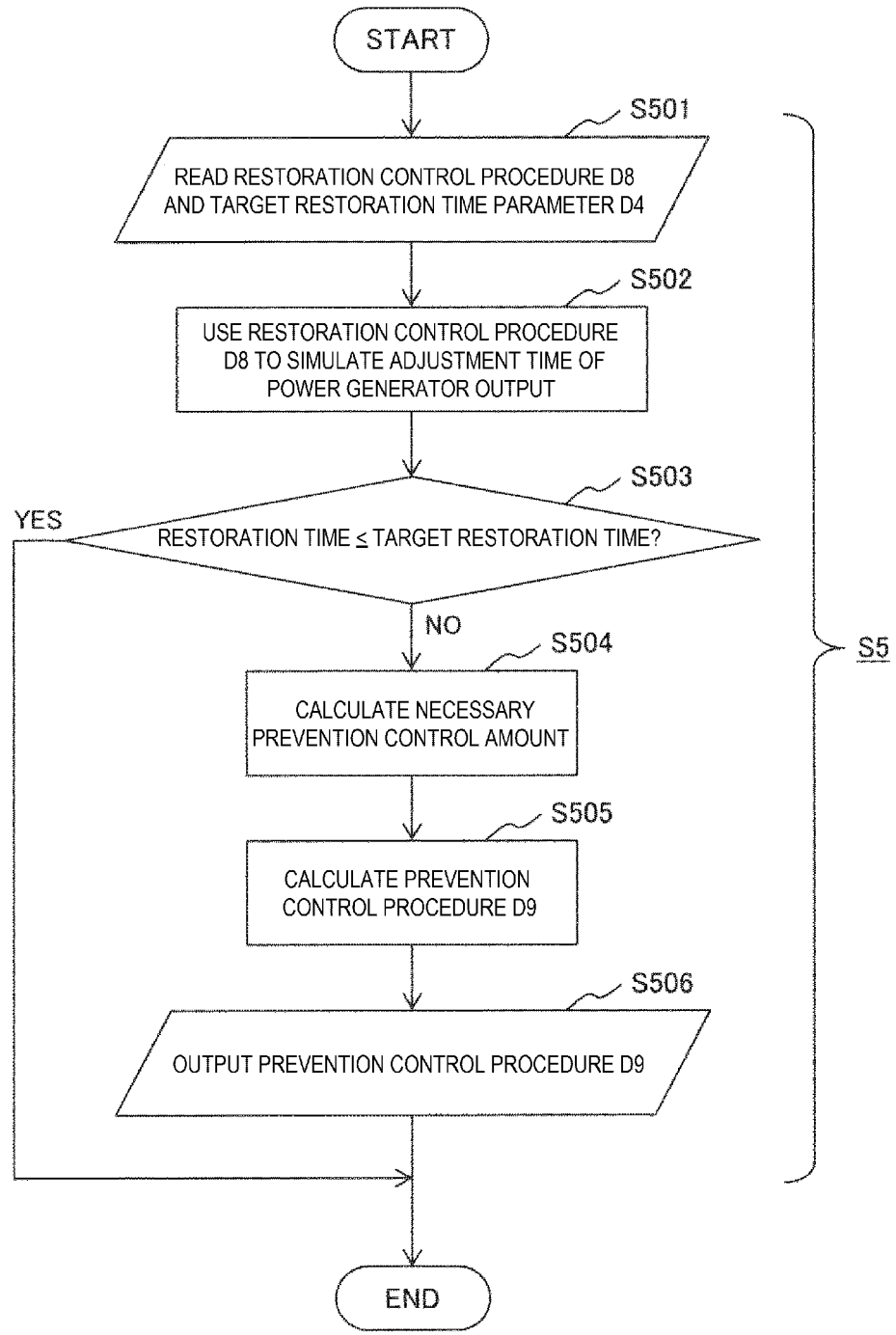

[FIG. 15]
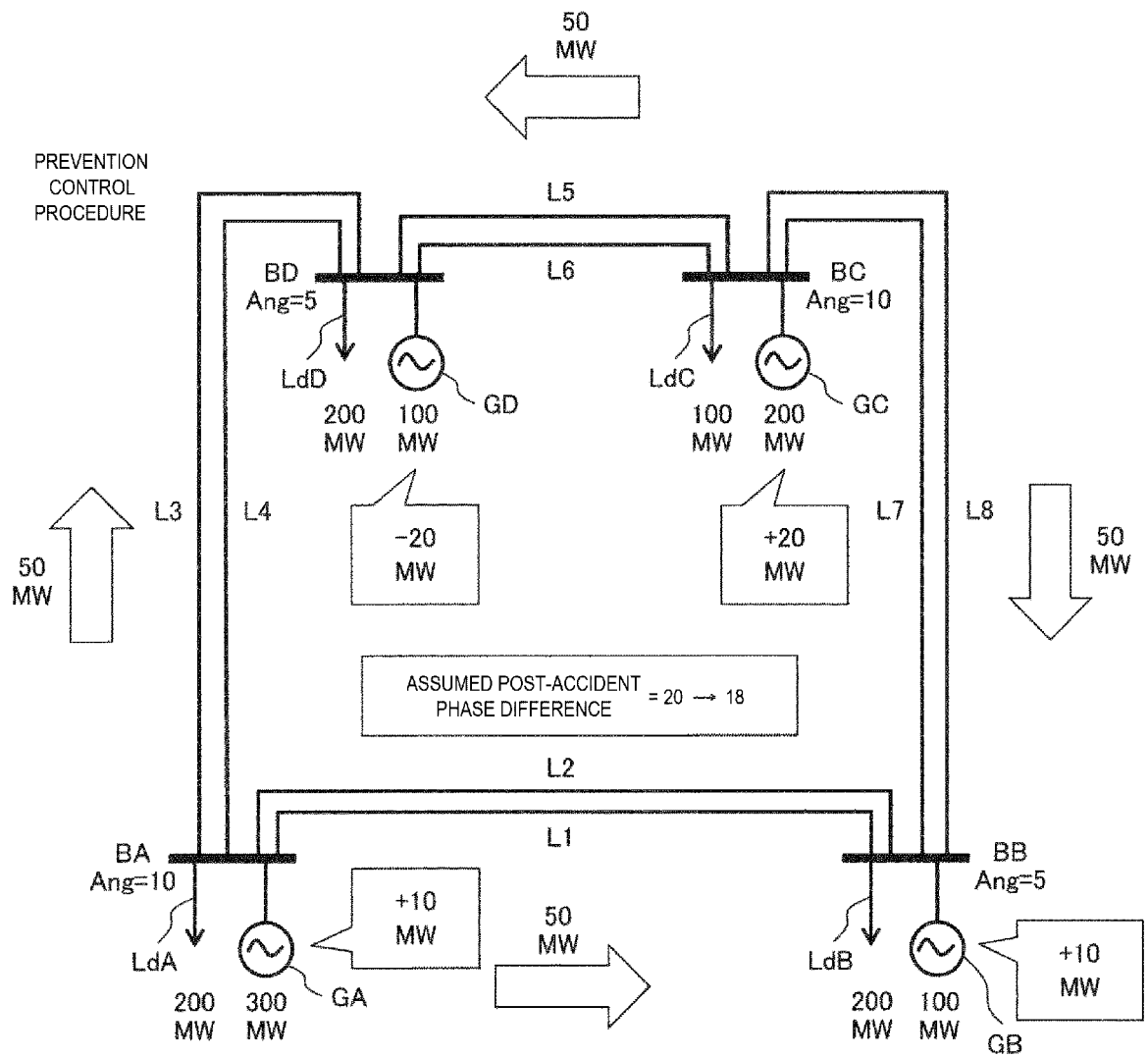

[FIG. 16]
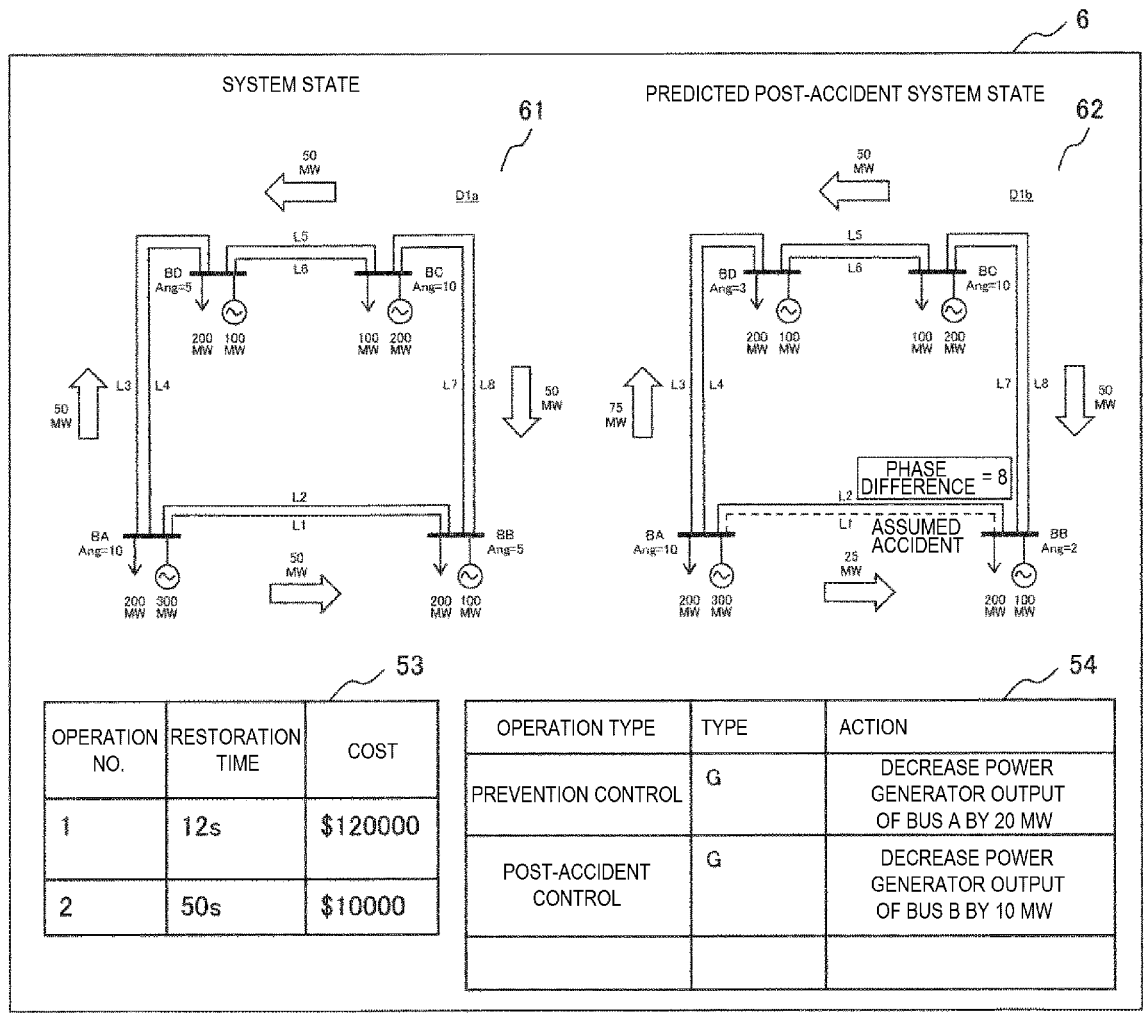
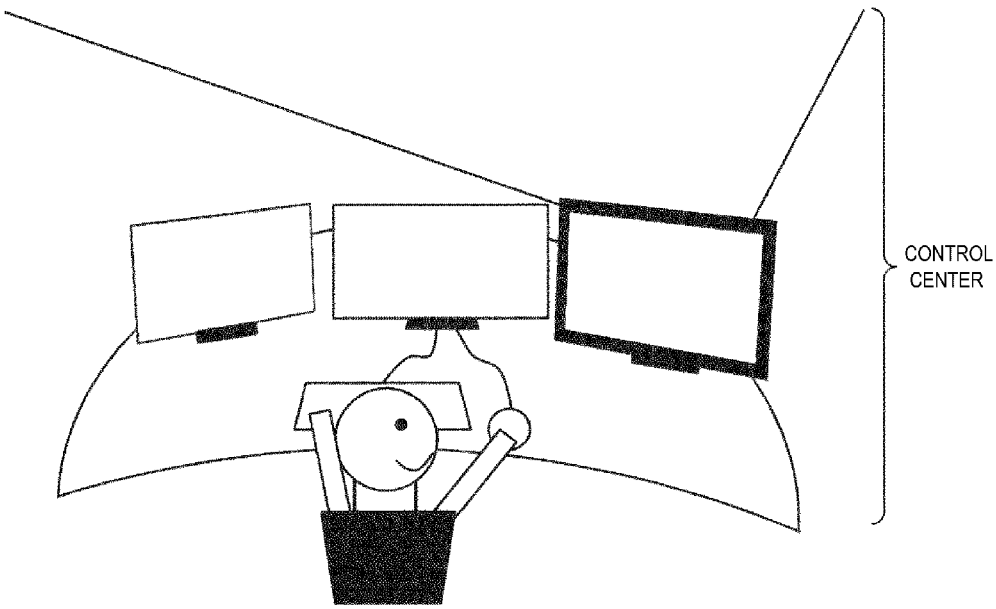

[FIG. 17]
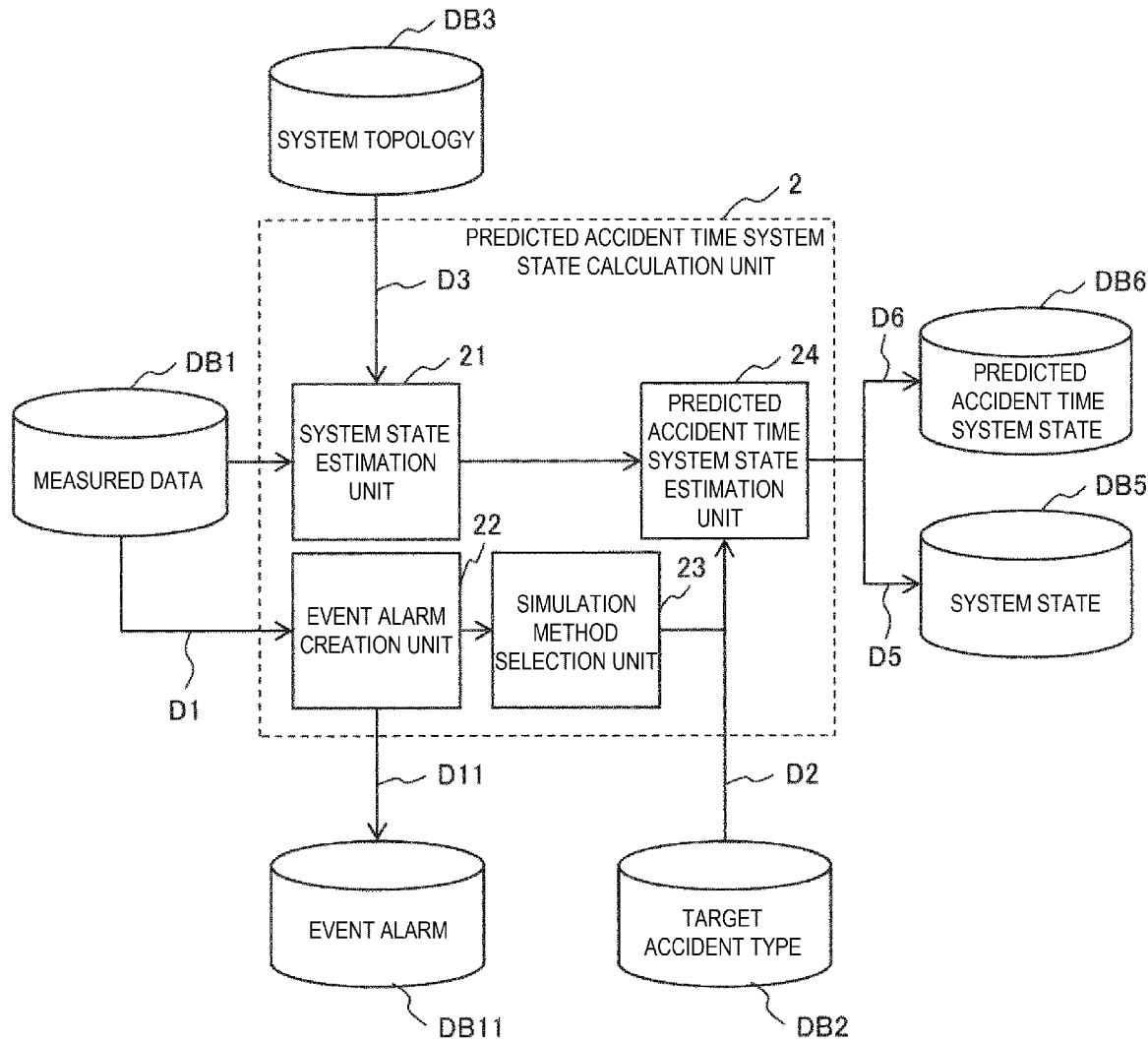

[FIG. 18]
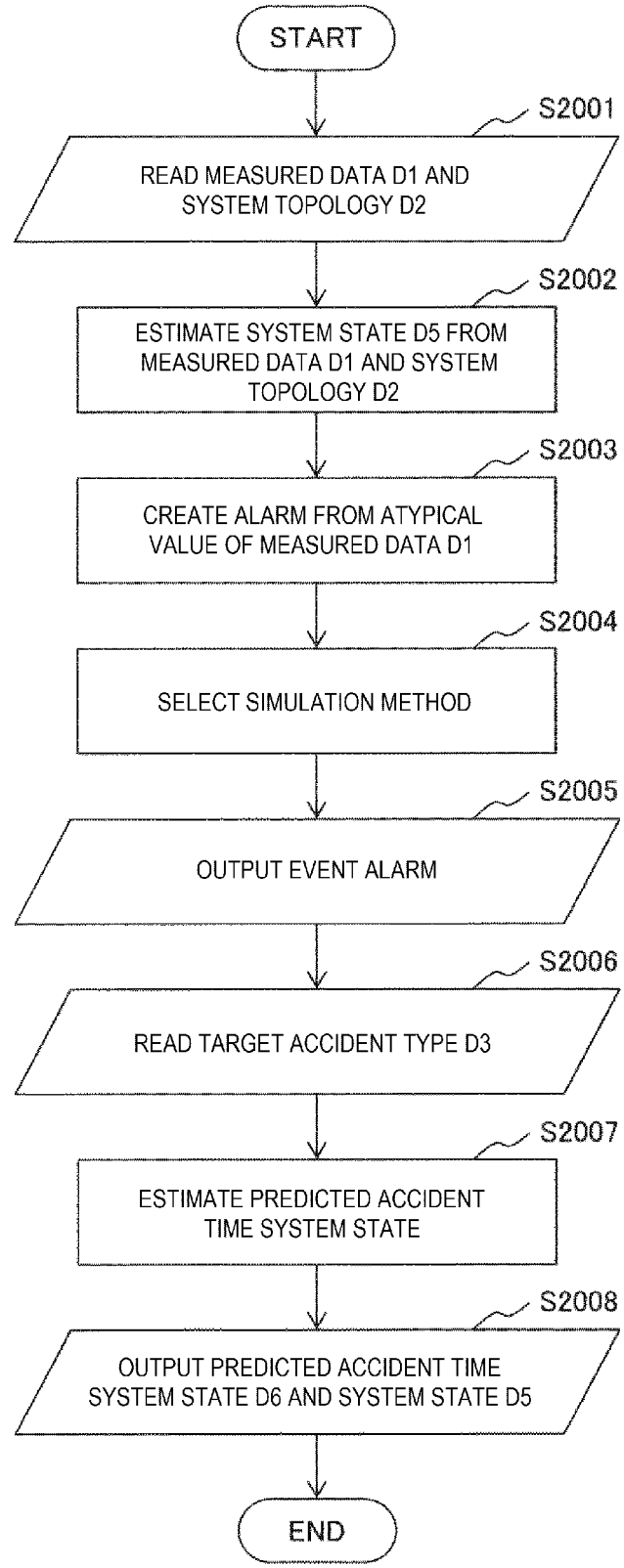

[FIG. 19]
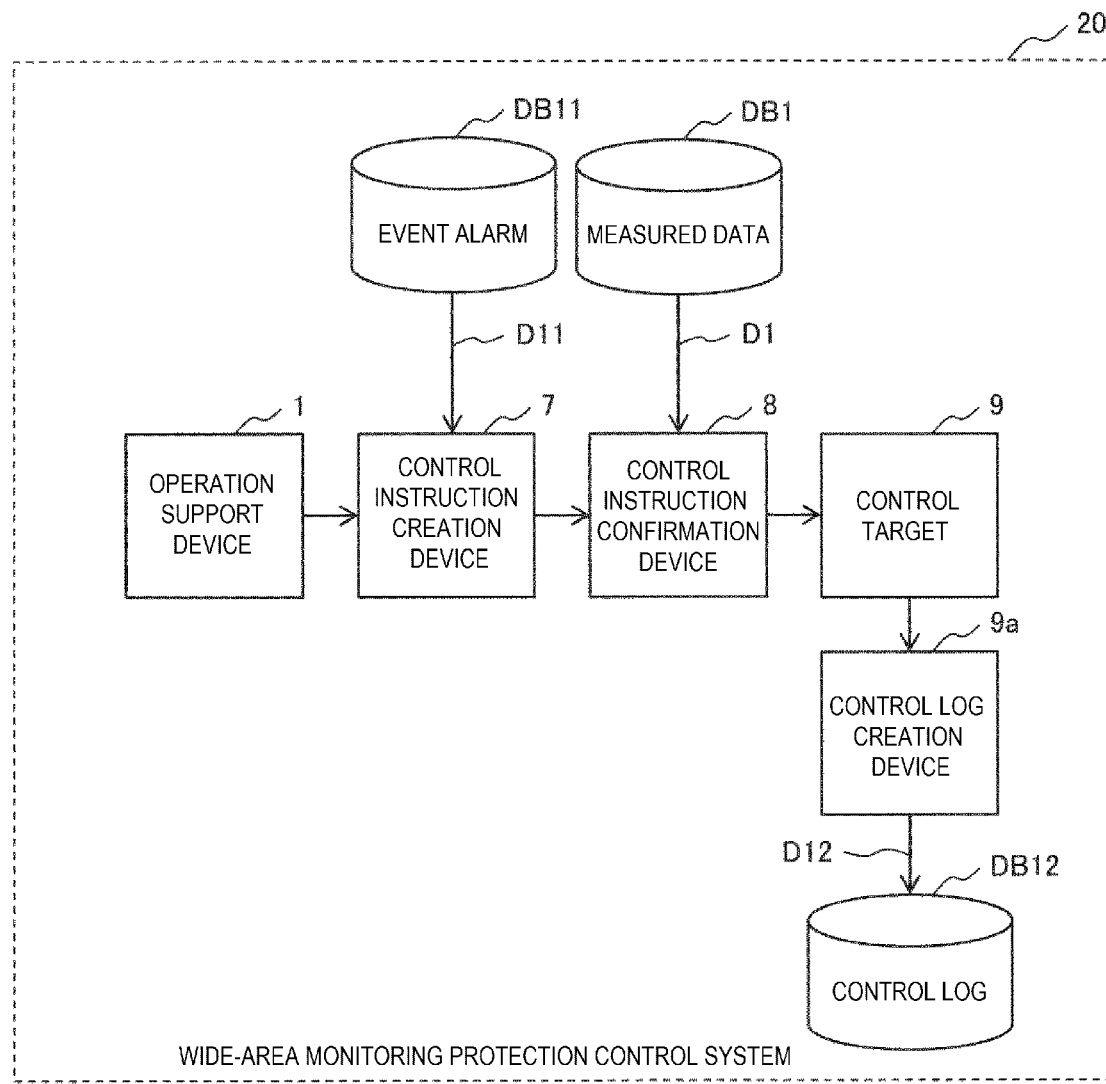

[FIG. 20]
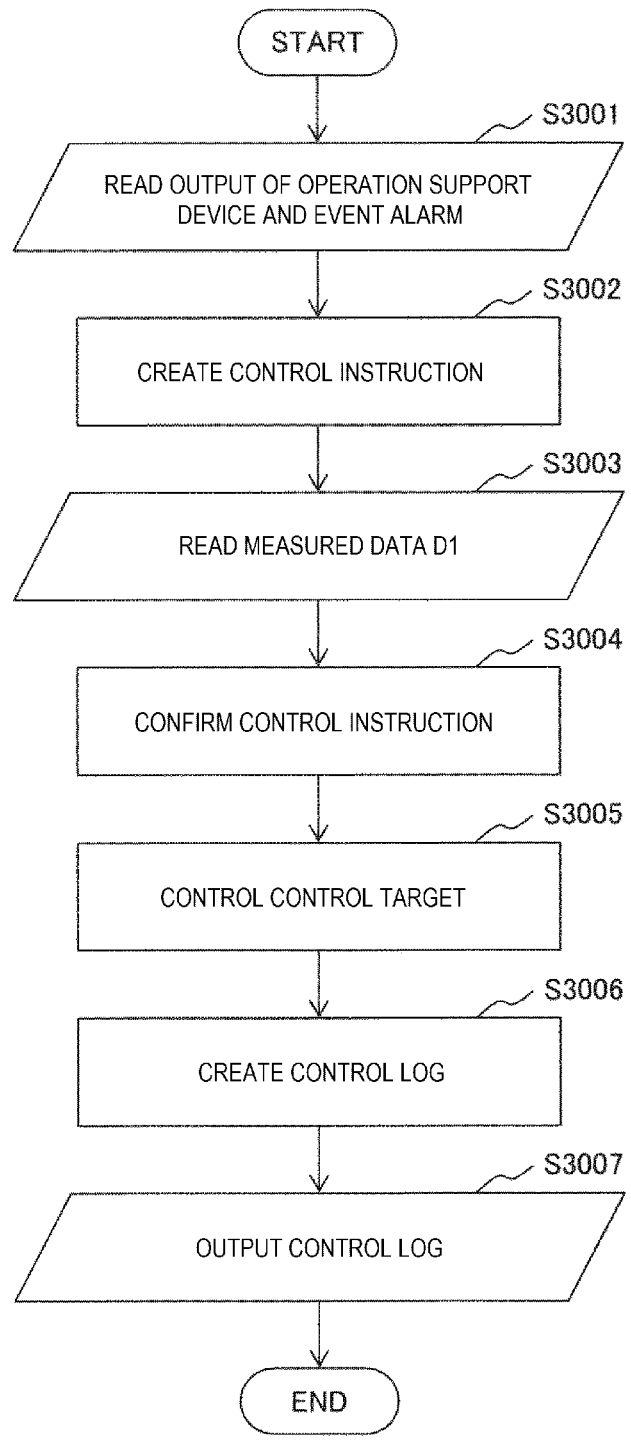

SYSTEM OPERATION SUPPORT DEVICE AND METHOD IN POWER SYSTEM, AND WIDE-AREA MONITORING PROTECTION CONTROL SYSTEM

TECHNICAL FIELD

The present invention relates to a system operation support device and a method in a power system, and a wide-area monitoring protection control system.

BACKGROUND ART

Complexity of a power system is increasing due to an introduction of renewable energy and aging of equipment in the power system. Therefore, it is difficult to stabilize the power system.

PTL 1 is known as a background art in the technical field of the invention. PTL 1 describes a problem that "it is difficult to grasp an accurate state of a power system".

As a solution for the problem, PTL 1 discloses that "a device that recognizes the state of the power system receives power flow state data and system topology data as inputs to monitor a voltage phase difference at power transmission line ends, monitors a change in the voltage phase difference at the power transmission line ends, and notifies a user interface in response to the change".

It is also disclosed in the solution of PTL 1 that "an action set of power system control that eliminates the phase difference at the power transmission line ends which exceeds a threshold is presented".

Non-patent Literature 1 is also known as a background art in the technical field of the invention. Non-patent Literature 1 describes "a phase difference at power transmission line ends is eliminated by power transmission line loss phase difference sensitivity".

PRIOR ART LITERATURE

Patent Literature

PTL 1: US2016/0334447

Non-Patent Literature

Non-Patent Literature 1: K. E. Van Horn, A. D. Dominguez-Garcia and P. W. Sauer, "Sensitivity-based line outage angle factors", 2015 North American Power Symposium (NAPS), Charlotte, N.C., 2015, pp. 1-5.

SUMMARY OF INVENTION

Technical Problem

In PTL 1, the power system is stabilized by monitoring the phase difference at the power transmission line ends in the power system and presenting a menu for control (control menu). However, control procedures assumed from the control menu are enormous, and it is difficult for an operator of the power system to calculate an appropriate control procedure from the control menu based on an accident constraint.

In Non-Patent Literature 1, the phase difference at the power transmission line ends of a power system is locally predicted by a sensitivity calculation to support prevention control (advance control). However, although a prevention control menu can be formulated, a control procedure cannot be calculated based on an accident constraint.

From the above description, the invention provides a system operation support device and a method in a power system, and a wide-area monitoring protection control system. The system operation support device and the method are capable of performing operation support for a power system operator in order to stabilize the power system.

Solution to Problem

In order to solve the above problems, an exemplary embodiment of the invention provides a system operation support device that stabilizes a power system. The system operation support device in the power system includes: a predicted accident time system state calculation unit that receives measured data, a system topology and a target accident type as inputs and calculates a system state and a predicted accident time system state; a control menu calculation unit that receives a result of the predicted accident time system state calculation unit as an input and calculates a control menu; a restoration control method calculation unit that receives a result of the control menu calculation unit as an input and calculates a restoration control procedure; a restoration prevention control procedure calculation unit that receives a result of the restoration control method calculation unit and a target restoration time parameter as inputs and performs a power generator output adjustment time simulation, a necessary prevention control amount calculation, and a prevention control procedure calculation; and a display unit that displays the restoration control procedure and the prevention control procedure.

The invention further provides a system operation support method in a power system that stabilizes the power system. The system operation support method in the power system includes: calculating a system state and a predicted accident time system state by receiving measured data, a system topology, and a target accident type as inputs; calculating a control menu by receiving a calculation result as an input; calculating a restoration control procedure by receiving the control menu as an input; and performing a power generator output adjustment time simulation, a necessary prevention control amount calculation, and a prevention control procedure calculation by receiving the restoration control procedure and a target restoration time parameter as inputs; and outputting the restoration control procedure and a prevention control procedure.

The invention further provides a system operation support device in a power system. The system operation support device in the power system includes: in a first state before an assumed accident occurs in the power system, a restoration control procedure calculation function of calculating a restoration control procedure to the first state and a second state after the assumed accident occurs in the power system; a restoration prevention control procedure calculation function of calculating a prevention control procedure to complete the restoration control procedure within a set target restoration time; and a display unit that presents control operation to the power system that is determined by the prevention control procedure in the first state before the assumed accident occurs.

The invention further provides a system operation support device in a power system having a configuration of a plurality of lines and a power generator. The system operation support device includes: a restoration control procedure calculation function of determining a restoration control procedure to adjust a power generator output before both ends of an accident section are reused when a phase difference at both ends of the accident section is equal to or more than a predetermined value, the accident section being broken down at time of an assumed accident in the power system; a restoration prevention control procedure calculation function of calculating a prevention control procedure to complete the restoration control procedure within a predetermined time when time required for the restoration control procedure is equal to or more than the predetermined time; and a display unit that presents control operation of the power generator output determined by the prevention control procedure in a state before the assumed accident occurs.

The invention further provides a system operation support method in a power system. The system operation support method in the power system includes: in a first state before an assumed accident occurs in the power system, calculating a restoration control procedure to the first state and a second state after the assumed accident occurs in the power system; calculating a prevention control procedure to complete the calculated restoration control procedure within a set target restoration time; and executing control operation to the power system which is determined by the prevention control procedure in the first state before the assumed accident occurs.

The invention further provides a system operation support method in a power system having a configuration of a plurality of lines and a power generator. The system operation support method includes: determining a restoration control procedure to adjust a power generator output before both ends of an accident section are reused when a phase difference at both ends of the accident section is equal to or more than a predetermined value, the accident section being broken down at time of an assumed accident in the power system; calculating a prevention control procedure to complete the restoration control procedure within a predetermined time when time required for the restoration control procedure is equal to or more than the predetermined time; and presenting control operation of the power generator output determined by the prevention control procedure in a state before the assumed accident occurs.

Advantageous Effect

According to the invention, it is possible to provide a system operation support device and a method in a power system, and a wide-area monitoring protection control system. The system operation support device and the method are capable of performing operation support for a power system operator in order to stabilize the power system.

More specifically, according to embodiments of the invention, a restoration control procedure that allows the operator to perform restoration within a target restoration time and a prevention control procedure can be presented by using a target restoration time parameter and a restoration prevention control procedure calculation unit, and system operation support can be provided to the operator.

Other problems, configurations, and effects will be apparent from the description of the embodiments.

BRIEF DESCRIPTION OF DRAWINGS

FIG. 1 is a diagram showing an example of a configuration of a power system to which a system operation support system according to an embodiment of the invention is applied, and shows a first state of the power system.

FIG. 2 is a diagram showing the example of the configuration of the power system to which the system operation support system according to the embodiment of the invention is applied, and shows a second state of the power system.

FIG. 3 is a diagram schematically showing a time-series transition of the power system.

FIG. 4 is a diagram showing an example of an overall configuration of a system operation support device 1 according to a first embodiment.

FIG. 5 is a diagram showing a hardware configuration of the system operation support device 1 and an example of a configuration of a power system 12 according to the first embodiment.

FIG. 6 is a diagram showing an example of a processing flow of an entire processing of the system operation support device 1.

FIG. 7 is a diagram showing an example of measured data D1 stored in a measured data database DB1.

FIG. 8 is a diagram showing detailed processing content of a processing step S2 in FIG. 6.

FIG. 9 is a diagram showing an example of system state data D5 stored in a system state database DB5.

FIG. 10 is a diagram showing an example of predicted post-accident system state data D6 stored in a predicted post-accident system state database DB6.

FIG. 11 is a diagram showing detailed processing content of a processing step S3 in FIG. 6.

FIG. 12 is a diagram showing an example of control menu data D7 stored in a control menu database DB7.

FIG. 13 is a diagram showing an example of a restoration control procedure D8 stored in a restoration control procedure database DB8.

FIG. 14 is a diagram showing detailed processing content of a processing step S5 in FIG. 6.

FIG. 15 is a diagram showing an example of a restoration prevention control procedure D9 stored in a restoration prevention control procedure database DB9.

FIG. 16 is a diagram showing an example of display content on a display unit 6.

FIG. 17 is a diagram showing a modification of a predicted accident time system state calculation unit 2 in the system operation device 1 according to the first embodiment.

FIG. 18 is a processing flow showing processing content of the predicted accident time system state calculation unit 2 according to a second embodiment.

FIG. 19 is a diagram showing an example of a configuration of a wide-area monitoring protection control system 20.

FIG. 20 is a processing flow showing processing content of the wide-area monitoring protection control system 20 according to a third embodiment.

DESCRIPTION OF EMBODIMENTS

Hereinafter, embodiments of the invention will be described in detail with reference to the drawings.

To explain a system operation support device and a method, and a wide-area monitoring protection control system according to the embodiments of the invention, an example of a power system that is an application target is shown as a premise thereof.

FIGS. 1 and 2 show an example of a configuration of a power system which is an application target of the system operation support device and the method, and the wide-area monitoring protection control system according to the embodiments of the invention. FIG. 1 shows a first state of the power system 12 and FIG. 2 shows a second state of the power system 12. In FIGS. 1 and 2, L represents a power transmission line, G represents a power generator, B represents a bus, and Ld represents a load, which constitute the grid-like power system 12. The first state shows an example in which all lines are operated by several lines, for example, by two lines, and the second state shows an example in which a part of the lines is broken down due to an accident or the like and the power system is operated by a remaining one line.

A time-series transition in FIGS. 1 and 2 is, for example, a transition from the first state (all lines are operated by two lines) in FIG. 1, in which an accident occurs in a part (a power transmission line L1) of the power system 12 and the part is broken down, to the second state in FIG. 2 in which a part of the power system 12 is operated by one line (between buses BA and BB). The invention intends to allow processing to be executed quickly when the power system is restored from the second state to the first state.

FIG. 3 is a diagram schematically showing the time-series transition. At a time point t0, the power system is in the first state in FIG. 1 and is operated with power PA. At a time point t1, an accident occurs in the power transmission line L1 and this section is broken down accompanying power fluctuation. At a time point t2, the power fluctuation is converged, and the power system is in the second state in FIG. 2 and is changed to be operated with power PB. Further, FIG. 3 shows that a restoration processing to the first state starts at a time point t3 in the second state, and the power system returns to the first state of being operated by two lines at a time point t5.

An object of the invention is to quickly return to the first state by the restoration processing in the second state. More specifically, at the time point t0 which is a current time point in the first state in FIG. 1, an accident of the power system which may occur in a future time point and a state change of the power system are assumed, and in order to quickly execute a restoration processing at the future time point, a power operation item to be formed at the current time point t0 is determined. The spirit of the invention is that a restoration completion processing which will occur in a future time point can be advanced from the time point t5 to the time point t4 by reviewing power operation at the time point t0 before the time point t1 when the accident occurs.

First Embodiment

The first embodiment describes an example in which a system operation support system is applied to stabilize operation of the power system.

FIG. 4 is a diagram showing an example of an overall configuration of the system operation support device 1 according to the first embodiment. Functions of the system operation support device 1 include a restoration control procedure calculation function 1A and a restoration prevention control procedure calculation function 1B. Here, the restoration control procedure calculation function 1A is a function of calculating a restoration control procedure that is executed between the future time points t3 and t5 at the current time point t0 in FIG. 3. The restoration prevention control procedure calculation function 1B is a function of performing a scheme (a power operation item to be formed at the current time point t0) that allows the restoration control procedure to be executed for a short period of time within the future time points t3 to t4 in FIG. 3.

The system operation support device 1 is configured with a computer system, and FIG. 4 shows databases DB held by the system operation support device 1 and processing functions in the system operation support device 1 in a block form.

The databases DB held in the system operation support device 1 include the measured data database DB1, a target accident type database DB2, a system topology database DB3, a target restoration time parameter database DB4, the system state database DB5, the predicted accident time system state database DB6, the control menu database DB7, the restoration control procedure database DB8, and the prevention control procedure database DB9.

Data in the databases DB is prepared in advance, generated by an intermediate processing, or used as a final output. Processing of the restoration control procedure calculation function 1A executed using the data is as follows. The restoration control procedure calculation function 1A uses the DB1 to DB3, DB5 to DB8 as databases to finally calculate a restoration control procedure that is executed within the future time points t3 to t5 at the current time point t0 in FIG. 3. The restoration control procedure calculation function 1A is configured with processing functions of the predicted accident time system state calculation unit 2, a control menu calculation unit 3, and a control procedure calculation unit 4.

Among the processing functions of the restoration control procedure calculation function 1A, the predicted accident time system state calculation unit 2 receives the measured data D1 stored in the measured data database DB1, target accident type data D2 stored in the target accident type database DB2, and system topology data D3 stored in the system topology DB3 as inputs to form the system state data D5 in the system state database DB5 and the predicted accident time system state D6 in the predicted accident time system state database DB6. In a simple manner, a function here is a prediction and an estimation of a system state after an assumed system accident occurs.

The control menu calculation unit 3 receives data (the system state data D5 and the predicted accident time system state D6) stored in the system state database DB5 and the predicted accident time system state database DB6 as inputs to generate the control menu data D7 and stores the control menu data D7 in the control menu database DB7. In a simple manner, this function is to request a control menu that is available for a restoration processing which is executed at the time points t3 to t5.

The control procedure calculation unit 4 receives the control menu data D7 stored in the control menu database DB7 as an input to generate the restoration control procedure data D8, and stores the restoration control procedure data D8 in the restoration control procedure database DB8.

It will be described below in detail that reconnection (reuse) of a cutoff section in the power system is executed on a premise that a phase difference at both ends of the cutoff section is within a limit value. Therefore, when the phase difference at both ends of the cutoff section is equal to or more than the limit value, it is necessary to make a restoration plan including reconfiguration of the power system so as to set the phase difference at both ends of the cutoff section within the limit value. The reconfiguration of the power system is implemented by reviewing outputs of a plurality of power generators that form the power system. Therefore, the control menu calculation unit 3 of the restoration control procedure calculation function 1A calculates sensitivity (a ratio of a phase difference to a power generator output) of each power generator as a control menu. The control procedure calculation unit 4 calculates, as a restoration control procedure, a combination of power generator outputs allowing the phase difference at both ends of the cutoff section to be within the limit value after considering sensitivity, and executes the reconnection (reuse) of the cutoff section in the power system after implementing power generator outputs that ensure a stable input. The restoration processing by the restoration control procedure calculation function 1A is a plan executed at the time point t3 to the time point t5.

In contrast, processing of the restoration prevention control procedure calculation function 1B is as follows. The restoration prevention control procedure calculation function 1B uses the DB4 and the DB9 as databases to finally, at the current time point t0 in FIG. 3, propose a measure at the current time point that allows the restoration control procedure which will be executed within the future time points t3 to t5 to be executed and completed within the time point t3 to the time point t4. The restoration prevention control procedure calculation function 1B includes processing functions of the restoration prevention control procedure calculation unit 5 and the display unit 6.

The restoration prevention control procedure calculation unit 5 in the restoration prevention control procedure calculation function 1B receives the restoration control procedure data D8 stored in the restoration control procedure database DB8 and the target restoration time parameter data D4 in the target restoration time parameter database DB4 as inputs to calculate the prevention control procedure data D9 and stores the prevention control procedure data D9 in the prevention control procedure database DB9.

The display unit 6 displays directly data including the prevention control procedure data D9 stored in the prevention control procedure database DB9 on a screen or displays the data after processing, and presents support information to an operator.

FIG. 5 is a diagram showing a hardware configuration of the system operation support device 1 and an example of a configuration of the power system 12 according to the first embodiment.

FIG. 4 describes the system operation support device 1 in terms of the databases DB and the processing functions, and FIG. 5 describes the system operation support device 1 in terms of a hardware configuration. When the system operation support device 1 is described in terms of a hardware configuration, the system operation support device 1 includes a plurality of databases DB (DB1 to DB9), a memory H1, a communication unit H2, an input unit H3, a CPU 91, the display unit 6, and a plurality of program databases DB20, DB30, and DB40, which are connected to a bus H4.

In the hardware configuration in FIG. 5, first, the input unit H3 includes at least one of a pointing device such as a keyboard switch and a mouse, an eye estimation device using a touch panel, a tablet, a camera, and the like, a brain wave conversion device, and a voice instruction device. The input unit H3 may be a user interface other than the above devices.

The communication unit H2 includes a circuit for connection to a communication network 11 and a communication protocol.

The memory H1 is, for example, a Random Access Memory (RAM), and stores computer programs read from the program databases DB20, DB30, and DB40 and calculation result data and image data necessary for processing. The memory H1 is a memory that temporarily stores, for example, calculation result data, and temporary calculation data such as the measured data D1, image data for display, and calculation result data. The CPU 91 generates necessary image data and displays the image data on the display unit 6 (for example, a display screen for display). Although a physical memory of the memory H1 is used in an arithmetic processing, a virtual memory may be used.

Screen data stored in the memory H1 is sent to the display unit 6 and displayed. The display unit 6 includes at least one of a display, a printer device, a sound output device, a portable terminal, a wearable device, and the like.

The CPU 91 reads and executes a predetermined computer program from the program databases DB20, DB30, and DB40. The CPU 91 may be one or a plurality of semiconductor chips or a computer device such as a computing server. The CPU 91 executes calculation programs read by the memory H1 from the program databases DB20, DB30, and DB40, and executes an arithmetic processing such as searching data in various databases (DB1 to DB9).

In the power system 12 shown in FIG. 5, a measurement device 10 including a measurement device 10a and a measurement device 10b (hereinafter, referred to as the measurement device 10) measures measurement values at various places in the power system, and transmits measurement results to the communication unit H2 of the system operation support device 1 via the communication network 11. A measurement value received by the system operation support device 01 by transmission is temporarily held in the memory H1, and then stored in the measured data database DB1 as the measured data D1.

Here, an example of the measurement device 10 includes a measurement machine or a measurement instrument that is installed in the power system such as Phasor Measurement Units (PMU), Voltage Transformer (VT), Potential Transformer (PT), Current Transformer (CT), or Telemeter (TM). Further, the measurement device 10 may be a measurement value aggregation device that is installed in the power system such as Supervisory Control And Data Acquisition (SCADA).

The measured data D1 stored in the measured data database DB1 is described above, and summary of data stored in a database other than the measured data database DB1 will be described below.

Next, a processing flow of the system operation device 1 according to the first embodiment will be described with reference to FIG. 6. FIG. 6 shows an example of a processing flow of an overall processing of the system operation support device 1. Content will be described using processing steps S1 to S6.

First, in the processing step S1, stored data (the measured data D1, the system topology data D3, and the target accident type data D2) is read from the measured data database DB1, the system topology database DB3, and the target accident type database DB2. Here, data may be aggregated and stored in a plurality of tables in one or more databases.

Here, an example of the measured data D1 stored in the measured data database DB1 will be described with reference to FIG. 7. The measured data database DB1 has a characteristic of including, for example, a time point D11, a measurement value D12, and measurement information D13 as the measured data D1 from the power system 12.

The data may be collected from a plurality of places in the power system and may include various kinds of information about the measurement device. The information may be an introduction date, an average error, a manufacturer, a type, a manufacturing number, a product number, an operation time, an operation rate, and the like of the measurement device.

Next, an example of the system topology data D3 stored in the system topology data database DB3 will be described with reference to FIG. 1. As shown in the example of the configuration of the power system in FIG. 1, the system topology data D3 indicates connection states of various devices, machines, and the like in the power system 12. For example, FIG. 1 shows connection among the power system bus B, the power transmission line L, the power generator G, the load Ld, the STATCOM, the SVR, and the like in the power system. In the first embodiment, as shown in FIG. 1, the bus B of the power system, the power generator G and the load Ld that are connected to the bus B, and the power transmission line L that connects buses are taken as targets and connection states thereof are shown. The system topology data D3 includes and holds parameters obtained by modeling the power system such as impedance or a time constant of each device.

Returning to FIG. 6, in the processing step S2, the system state data D5 and the predicted accident time system state data D6 are calculated. A type of event that may occur in the power system 12 is accumulated and stored in the target accident type data D2, which may include, for example, an N-1 accident, an N-2 accident, and an N-1-1 accident which are caused by a power transmission accident or a bus accident.

FIG. 8 shows detailed processing content of the processing step S2 in FIG. 6. Here, details of the processing step S2 will be described with reference to FIG. 8. In a processing step S201, the measured data D1, the system topology data D2, and the target accident type data D3 are read. In a processing step S202, the system state data D5 is estimated using the input data D1. In a processing step S203, the predicted accident time system state data D6 is estimated. In a processing step S204, the system state data D5 and the predicted accident time system state data D6 are output.

FIG. 9 is a diagram showing an example of the system state data D5 stored in the system state database DB5. Next, the system state data D5 will be described with reference to FIG. 9. The system state data D5 is calculated using the above-described measured data D1 and the system topology data D2. Here, a state includes, for example, a bus voltage, a bus phase, and a power flow direction on the power transmission line.

A calculation method may combine the system topology data D2 when the measured data D1 is sufficient. When the measured data D1 is insufficient, calculation may be executed using a technique of recognizing the state of the power system such as a power flow calculation or a state estimation.

FIG. 9 shows an example of the system state data D5 at the current time point t0, and shows power flows between buses, power generator outputs, loads, and the like in the power system 12. A configuration of the power system in FIG. 9 is the configuration in the first state in FIG. 1. In the first state, magnitudes of a power flow between buses, a power generator output, and a load in each part are shown by values in FIG. 9.

FIG. 10 is a diagram showing an example of the predicted post-accident system state data D6 stored in the predicted post-accident system state database DB6. Here, the predicted post-accident system state data D6 indicates system state data in a state after an accident, which is assumed by the target accident type data D2, occurs in the power system 12 from the system state data D5 which is a state value before the accident occurs. Here, the predicted post-accident system state data D6 holds a power flow state, a voltage, a phase, a device state, and the like after the accident.

A configuration of the power system in FIG. 10 is the configuration in the second state in FIG. 2. In the second state, magnitudes of the power flow between buses, the power generator output, the load, and the voltage phase difference between buses in each part are shown by values in FIG. 10. When the power transmission line L1 is broken down because an assumed malfunction occurs in the power transmission line L between the buses BA and BB and operation is executed by one line in this part, a distribution of the power flow between the buses is different from the power flow in FIG. 4. The voltage phase difference to be described below between the buses BA and BB is increased to 20 degrees. However, magnitudes of the power generator output and the load do not change before and after the assumed malfunction.

As a method for predicting the system state at the time of an assumed accident, various known methods can be used. A calculation of the predicted post-accident system state D6 may use a model-based method using a system model, a measurement-based method using the measured data D1 only, or a method of combining the measured data D1 and the system model. Examples of the methods include a model-based transient calculation, a model-based power flow calculation, a measurement-based regression prediction, and the like.

When it is necessary to increase a prediction speed of the predicted post-accident system state D6, a local prediction such as Line Outage Angle Factor (LOAF) disclosed in Non-patent Literature 1 may be used. The LOAF is a linear sensitivity calculation of a phase difference at power transmission line ends calculated from impedance and a power flow state in a certain topology of the power system. In order to calculate the predicted post-accident system state D7, a similar predicted post-accident system state may be derived from an accumulated analysis result using a similar example search method. Accordingly, a calculation time lag in an online calculation can be reduced.

Here, a specific example of FIG. 10 used in the first embodiment will be described in details. The predicted post-accident system state shown in FIG. 10 is a predicted system state after an N-1 power transmission line accident. Compared to the system state D6 in FIG. 9, the power flow changes greatly, and the phase difference at the power transmission line ends increases due to a route (transmission line group connected between the buses) change that is influenced by an accident. Therefore, the power transmission line L1 cannot be reused, and the system state is in a vulnerable state. In such a state, when an unstable power source such as a renewable energy source breaks down, there is a possibility that the system cannot be stabilized. Therefore, it is an object of the system operation device 1 to shorten the time when the power system is in the vulnerable state. Shortening the time includes a measure to shorten and speed up time required for the restoration processing in FIG. 3.

Returning to FIG. 6, the control menu D7 is created in the processing step S3. FIG. 11 is a diagram showing detailed processing content of the processing step S3 in FIG. 6. In a first processing step S301 in the detailed processing flow in FIG. 11, the predicted accident time system state D6 is read. In a processing step S302, power generator sensitivity of the predicted accident time system state D7 is calculated. In a processing step S303, the power generator sensitivity is prioritized, and the control menu D7 is created. In a processing step S304, the control menu D7 is output.

Here, each processing step will be described in detail. The power generator sensitivity in the processing step S302 is an amount of change in the phase difference at target transmission line ends obtained by adjusting each power generator output. The phase difference generated at the power transmission line ends is generated by the magnitude of the power flow and the impedance of a route through which the power flow passes, so that the phase difference can be operated using a change in the power flow by adjusting the power generator output.

The power generator sensitivity may be calculated from a power flow calculation formula of a power system model, or may be learned from past performance stored in the measured data D1. The control menu D7 in the processing step S303 is the power generator sensitivity that is prioritized using one or more of a level of the power generator sensitivity, a power generator capacity, a time constant of a power generator, and the like.

FIG. 12 is a diagram showing an example of the control menu data D7 stored in the control menu database DB7. Here, the power generator sensitivity (a ratio of the phase difference to the power generator output) obtained by a calculation is further shown in the state amount (the state amount shown in FIG. 10) of each part in the second state in FIG. 2. In the example, power generator sensitivity of a power generator GA is −0.3 (degree/MW), power generator sensitivity of a power generator GD is −0.2 (degree/MW), and power generator sensitivity of a power generator GC is 0.1 (degree/MW).

On the other hand, the voltage phase difference between buses between the buses BA and BB which is a section where the power transmission line L1 is broken down due to an assumed accident is increased to 20 degrees, and when the phase difference is not reduced to, for example, 15 degrees or less, the power transmission line L1 cannot be restored, in other words, cannot be reused. In this case, in order to reduce the phase difference within 15 degrees, it is effective to adjust an output of a power generator G in advance, and information of the power generator sensitivity is necessary when to determine how much power generation amount should be operated for a certain power generator. Therefore, in order to solve the problem, a most effective power generator is selected and displayed. By using information such as the control menu D7, the operator can select a power generator to be controlled and determine an approximate control amount of the selected power generator.

Returning to FIG. 6, the restoration control procedure D8 is created in the processing step S4. The creation of the restoration control procedure D8 is determination of a power generator control amount necessary for restoration by using, for example, the control menu D7.

FIG. 13 is a diagram showing an example of the restoration control procedure D8 stored in the restoration control procedure database DB8. A specific example of the restoration procedure D8 is shown with reference to FIG. 13. An adjustment amount is determined in descending order of sensitivity to adjust an output to a power generator having high sensitivity (an effective control target) determined by the control menu D7. In order to determine the control amount, a general control amount of each power generator is calculated from past measured data D1, a power generator control amount is allocated with reference to the general control amount, and the control amount is determined based on the allocated power generator control amount.

In the case shown in FIG. 13, the output of the power generator GA with the power generator sensitivity of −0.3 (degree/MW) is increased by 10 MW, the output of the power generator GD with the power generator sensitivity of −0.2 (degree/MW) is decreased by 20 MW, the output of the power generator GC with the power generator sensitivity of 0.1 (degree/MW) is increased by 20 MW, so that the voltage phase difference between buses between the buses BA and BB which is a section where the power transmission line L1 is broken down due to an assumed accident can be reduced to 5 degrees. In FIG. 13, as a result of the increase and decrease of power generator outputs, the power flow between buses is changed.

The processing of the processing steps S1 to S4 in FIG. 6 described with reference to the detailed flows in FIGS. 8 and 11 describes the restoration control procedure calculation function 1A in FIG. 4. The restoration procedure defined here is processing content executed for restoration in a state after the time point t2 which represents the second state in FIG. 3, represents a preparation procedure for turning on a circuit breaker after determining the power generation output after an accident of each power generator and ensuring the voltage phase difference within a standard value, and indicates a method of a post-accident restoration processing after the accident occurs. The restoration processing in such a way takes time from the time point t3 to the time point t5 in FIG. 3. In order to shorten the time, a restoration prevention processing described below is executed.

In a method of the restoration prevention processing, the power generation output of each power generator is determined preventively at the time point t0 which is the first state before an accident occurs, so that no large difference occurs even when the voltage phase difference increases after the accident. As a result, the restoration processing is simple and therefore can be performed in a short time.

Hereinafter, the restoration prevention control procedure calculation function 1B will be described in details. Returning to FIG. 6, the restoration prevention control procedure D9 is calculated in the processing step S5. Here, FIG. 14 is a diagram showing detailed processing content of the processing step S5 in FIG. 6. In a first processing step S501 in FIG. 14, the restoration control procedure D8 and the target restoration time parameter D4 are read. In a processing step S502, the restoration control procedure D8 is used to simulate the power generator output for a long time, and the simulation time is set as restoration time. In a processing step S503, it is confirmed whether the restoration time is equal to or less than a target restoration time. If Yes, the processing ends. If No, the processing proceeds to a step S504. In the processing step S504, a prevention control amount is calculated. In a processing step S505, the prevention control procedure D9 is calculated. In a processing step S506, the prevention control procedure D9 is output.

FIG. 15 is a diagram showing an example of the restoration prevention control procedure D9 stored in the restoration prevention control procedure database DB9. A specific example of the prevention control procedure D9 is shown with reference to FIG. 15. In FIG. 15, a prevention control amount is presented on the system state D5. According to FIG. 15, as a recommended operating state in the first state at the time point t2, compared to the operating state in the first state shown in FIG. 9, a plan is proposed in which the output of the power generator GA is increased by 10 MW, the output of the power generator GD is decreased by 20 MW, the output of the power generator GC is increased by 20 MW, and the output of the power generator GB is increased by 10 MW. In this case, it is assumed that the voltage phase difference between the buses BA and BB after an accident is 18 degrees, which is reduced from 20 degrees of a previous assumption. In this case, although it is necessary to execute a restoration processing (a re-calculation processing of the power generator output in order to ensure the voltage phase difference within 15 degrees) after an accident, the power generator output amount to be operated is small. Therefore, the restoration process is simple and can be executed in a short time. Processing time at this time is t3 to t4 in FIG. 3.

The method is based on a fact that the phase difference at the power transmission line ends after an accident is directly proportional to a power flow that flows in the power transmission line by the LOAF method disclosed in Non-patent Literature 1. In short, by controlling the power flow in advance, an operation point is changed before an accident occurs, which is changed to a state in which restoration can be executed within the target restoration time.

Returning to FIG. 6, the restoration control procedure D8 and the prevention control procedure D9 are displayed on a screen in the processing step S6. Here, a specific example of the display is shown with reference to FIG. 16. The display unit 6 is viewed by a system operator in, for example, a control center. The display unit 6 includes a system state display 61, a predicted accident time system state display 62, an operation procedure list 53, an operation procedure detail 54, and the like.

The system state display 61 displays the system state D5 in the first state. The system state D5 is displayed, for example, by a node breaker model. Similarly, the predicted accident time system state display 62 displays the predicted accident time system state D6. The operation procedure list 53 is obtained by comprehensively evaluating and listing the restoration control procedure D8 and the prevention control procedure D9. The operation procedure list 53 may display, for example, the restoration time and costs. The operation procedure detail 54 shows details of the previous restoration control procedure DB8 and the prevention control procedure D9.

Here, effects of the present embodiment will be described. When a power system operator performs confirmation on the display unit 6, power system operation can recognize a current system state, a predicted post-accident system state, a control procedure and a prevention control procedure in which restoration from a predicted accident can be performed within target restoration time. Accordingly, the power system can be operated in terms of easy restoration, and stable power supply can be ensured.

Second Embodiment

A modification of the predicted accident time system state calculation unit 2 in the system operation support device 1 according to the first embodiment will be described in the second embodiment. In the second embodiment, an analysis method of the predicted accident time system state calculation unit 2 is changed according to a situation.

FIG. 17 is a diagram showing the modification of the predicted accident time system state calculation unit 2 in the system operation support device 1 according to the first embodiment. The predicted accident time system state calculation unit 2 in FIG. 17 includes a system state estimation unit 21 that receives the measured data D1 and the system topology D3 as inputs to estimate a system state, an event alarm creation unit 22 that receives the measured data D1 as an input to create an event alarm D11, a simulation method selection unit 23 that receives the event alarm D11 as an input to select a simulation method, and a predicted accident time system state estimation unit 24 that receives a system estimation result, a simulation method selection result, and the target accident type D2 as inputs to calculate the predicted accident time system state D6 and the system state D5.

FIG. 18 shows a processing flow showing processing content of the predicted accident time system state calculation unit 2 according to the second embodiment. In a first processing step S2001 in FIG. 18, the measured data D1 and the system topology D3 are read. In a processing step S2002, a system state is estimated from the measured data D1 and the system topology D3. In a processing step S2003, an event alarm is created from an atypical value of the measured data D1. In a processing step S2004, a simulation method is selected. In a processing step S2005, the event alarm is output. In a processing step S2006, a target accident type is read. In a processing step S2007, a predicted accident time system state is estimated. In a processing step S2008, the predicted accident time system state D6 and the system state D5 are output.

At the time of the processing step S2003, the atypical value is calculated by an atypicality detection method using one or more of statistics and thresholds. In the processing step S2004, the simulation method is selected based on an atypicality level (atypicality) of a result of the processing step S2003. When the atypicality level is high, an instantaneous value analysis method is used, and simulation using an effective value is selected when the atypical value is small.

By performing such processing, a more detailed analysis can be executed when an atypicality occurs in the power system, and it is possible to deal with a complicated situation. Further, high-speed performance can be maintained by performing an effective value based calculation in a less complicated situation.

Third Embodiment

The third embodiment is an example of a configuration when the system operation support device 1 according to the first and the second embodiments is applied to a wide-area monitoring protection control system.

FIG. 19 is a diagram showing an example of a configuration of the wide-area monitoring protection control system 20. The wide-area monitoring protection control system 20 includes a control instruction creation device 7 that receives outputs of the operation support device 1 and the event alarm D11 as inputs to create a control instruction, a control instruction confirmation device 8 that receives the measured data D1 and a result of the control instruction creation unit as inputs to confirm the control instruction, a control target 9 that receives a control confirmation signal as an input to execute control, and a control log creation device 9a that creates the control log D12 from a result of the control target 9. Other parts are the same as the system operation support device 1 in FIG. 1, and accordingly descriptions thereof will be omitted.

Here, a processing flow according to the third embodiment will be described with reference to FIG. 20. In a processing step S3001, an output of the operation support device and the event alarm D11 are read. In a processing step S3002, a control instruction is created. In a step S3003, the measured data D1 is read. In a processing step S3004, the control instruction is confirmed. In a processing step S3005, a control target is controlled. In a processing step S3006, a control log is created. In a processing step S3007, the control log is output.

Here, the control target 8 may be, for example, a STATCOM, a capacitor, and various control functions of a power generator. The control target may include a device for variable speed water, a storage battery or the like.

According to the third embodiment, first, high-speed automatic control can be executed by the wide-area monitoring protection control system 20 by using the output of the system operation support device 1 in a control instruction and confirming the control instruction. Further, a response or the like of the power system can be recorded and control can be further advanced by analyzing a created control log.

REFERENCE SIGN LIST

1: system operation support device
2: predicted accident time system state calculation unit
3: control menu calculation unit
4: restoration control procedure calculation unit
5: restoration prevention control procedure calculation unit
6: display unit
7: control instruction creation device
8: control instruction confirmation device
9: control target
9a: control log creation device
10: measurement device
11: communication network
12: power system
20: wide-area monitoring protection control system
21: system state estimation method
22: event alarm creation method
23: simulation method selection unit
24: predicted accident time system state estimation method
91: CPU
DB1: measured data database
DB2: target accident type database
DB3: system topology database
DB4: target restoration time parameter database
DB5: system state database
DB6: predicted accident time system state database
DB7: control menu database
DB8: control procedure database
DB9: prevention control procedure database
DB11: event alarm database
DB12: control log database
H1: memory
H2: communication unit
H3: input unit
H4: bus
P: system operator

The invention claimed is:

1. A system operation support device that stabilizes a power system, the system operation support device comprising:
   a predicted accident time system state calculation unit that receives measured data, a system topology and a target accident type as inputs and calculates a system state and a predicted accident time system state;
   a control menu calculation unit that receives a result of the predicted accident time system state calculation unit as an input and calculates a control menu;
   a restoration control method calculation unit that receives a result of the control menu calculation unit as an input and calculates a restoration control procedure;
   a restoration prevention control procedure calculation unit that receives a result of the restoration control method calculation unit and a target restoration time parameter as inputs and performs a power generator output adjustment time simulation, a necessary prevention control amount calculation, and a prevention control procedure calculation; and
   a display unit that displays the restoration control procedure and a prevention control procedure.

2. The system operation support device in the power system according to claim 1, wherein
   the predicted accident time system state calculation unit uses one or more of a model-based method using a system model based on a system state and a measurement-based method using measured data only.

3. The system operation support device in the power system according to claim 1, wherein
   the predicted accident time system state calculation unit includes one or more of a local prediction using a sensitivity calculation and a prediction based on a similar result from an accumulation analysis result using a similar example search method.

4. The system operation support device in the power system according to claim 1, wherein
   the predicted accident time system state calculation unit includes a system state estimation unit that receives the measured data and the system topology as inputs and estimates a system state, an event alarm creation unit that receives the measured data as an input and creates an event alarm, a simulation method selection unit that receives the event alarm as an input, and a predicted accident time system state estimation unit that receives a state estimation result of the system state estimation unit, a result of the simulation method selection unit, and a target accident type as inputs and calculates the predicted accident time system state and the system state.

5. A wide-area monitoring protection control system using the system operation support device in the power system according to claim 1, the wide-area monitoring protection control system comprising:
   a control instruction creation device that receives outputs of the system operation support device and an event alarm as inputs and creates a control instruction;
   a control instruction confirmation device that receives measured data and a result of the control instruction creation device as inputs and confirms a control instruction;
   a control target that is controlled by receiving a control instruction confirmation signal from the control instruction confirmation device as an input; and
   a control log creation device that creates a control log based on a result of the control target.

6. A system operation support method in a power system that stabilizes the power system, the system operation support method comprising:
   calculating a system state and a predicted accident time system state by receiving measured data, a system topology, and a target accident type as inputs;
   calculating a control menu based on a calculation result of the system state and the predicted accident time system state;
   calculating a restoration control procedure by receiving the control menu as an input;
   performing a power generator output adjustment time simulation, a necessary prevention control amount calculation, and a prevention control procedure calculation by receiving the restoration control procedure and a target restoration time parameter as inputs; and outputting the restoration control procedure and a prevention control procedure.

\* \* \* \* \*